No. 759,174. PATENTED MAY 3, 1904.
T. GRIES.
CHANGE SPEED GEAR.
APPLICATION FILED JUNE 9, 1903.
NO MODEL.

WITNESSES
S. C. Connor
Walter Abbe

INVENTOR
Theophile Gries
BY Howson & Howson
ATTORNEYS

No. 759,174. Patented May 3, 1904.

UNITED STATES PATENT OFFICE.

THÉOPHILE GRIÈS, OF LILLE, FRANCE.

CHANGE-SPEED GEAR.

SPECIFICATION forming part of Letters Patent No. 759,174, dated May 3, 1904.

Application filed June 9, 1903. Serial No. 160,761. (No model.)

*To all whom it may concern:*

Be it known that I, THÉOPHILE GRIÈS, a citizen of the French Republic, residing at 136 Rue du Faubourg de Roubaix, Lille, Department of Nord, Republic of France, have invented a certain new and useful Improvement in Change-Speed Gear, of which the following is a full, clear, and exact description.

This invention relates to a change-speed gear or mechanism by means of gear-wheels, the invention being applicable to automobiles and workshop-machines and in all cases where it is desired to effect the transmission of power from a shaft rotating at a speed regarded as constant to another shaft which has to revolve at certain different speeds, so as to obtain several relations or proportions of speed between the two shafts. The mechanism, which comprises toothed wheels permanently meshed, enables one speed to be changed to another without loss of time. It insures the change of speed taking place in a clean and certain manner and without the wear of the parts affecting its proper working, which inconvenience exists in the usual arrangements of change-gear wheels always in mesh. Further, it does not necessitate the declutching of the motor when changing from one speed to another—that is to say, it is not indispensable that the clutch or other connection between the motor and the change-speed gear should be thrown out.

The object of my invention is to improve the construction of the herein-described type of change-gear, so as to prevent abrasion and destruction of the key and keyways. This arrangement comprises a toothed wheel peripherally of ordinary construction, but of which the body is of special construction and which is mounted loosely on a shaft driven by the motor. This shaft is movable longitudinally and is fitted with a stud or finger which when engaged by a projection from the gear-wheel will cause the latter to rotate with the shaft. This gear-wheel is permanently engaged by or meshed with a toothed wheel fast to the driven shaft. This arrangement is repeated as many times as the device is to include changes of speed, and the changing from one speed to another is effected by moving the aforesaid driving-shaft so that its finger engages the projection of that set of gear-wheels which gives the relation required. This special gear-wheel, which is mounted on the driving-shaft and which is repeated as many times as gear relations are desired, is shown separately in Figures 1 to 4 of the annexed drawings.

Figure 3:
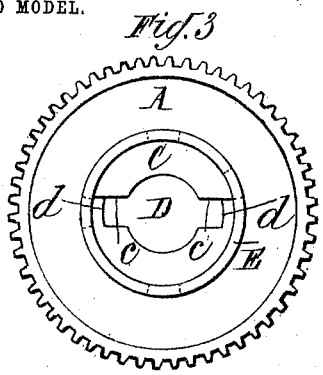
Figure 2:
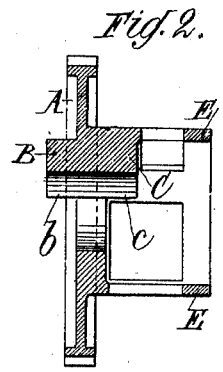
Figure 4:
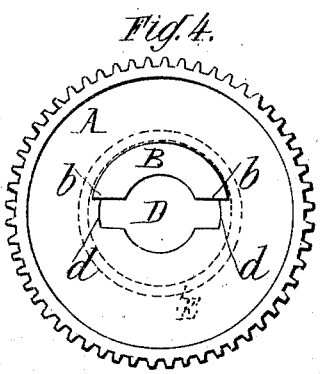
Figure 7:
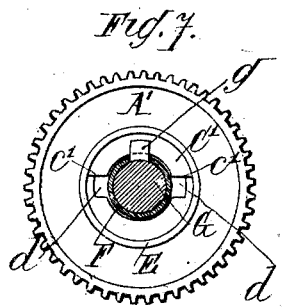
Figure 5:
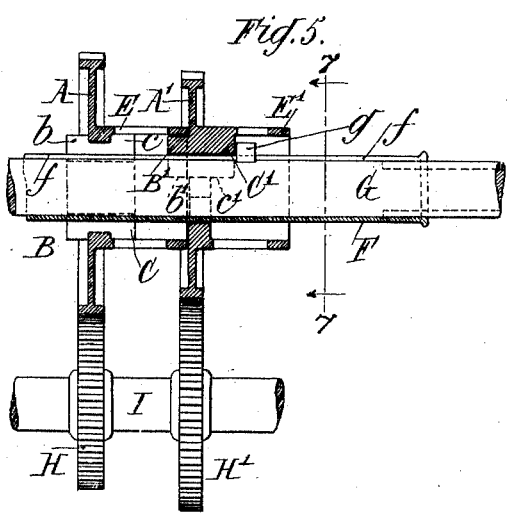
Figure 6:
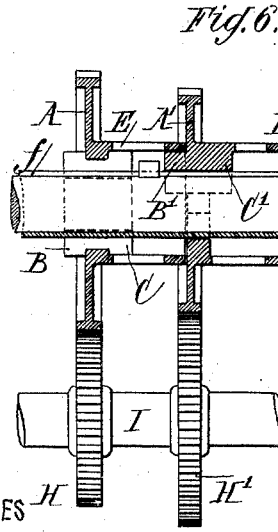
Figure 1:
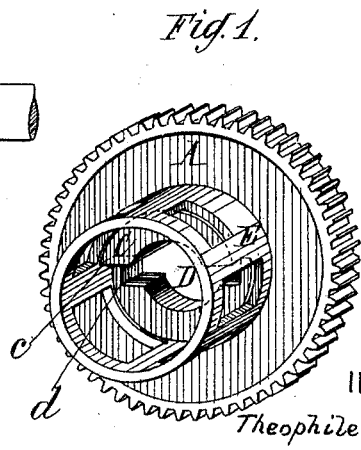

In the drawings, Fig. 1 is a perspective view of the gear-wheel which represents the characteristic of my invention. Fig. 2 is a longitudinal section of the same. Figs. 3 and 4 are two views in elevation of the faces of this gear-wheel. Figs. 5 and 6 show by way of example a change-speed gear comprising two speed gears, and therefore two of the toothed wheels shown in Fig. 1. Fig. 7 is an elevation in section on line 7 7 of Fig. 5.

The toothed wheel shown in Figs. 1 to 4 is characterized by two guiding projections B and C on the two faces of its body A, these projections being each shaped as an arc of a circle and the projections corresponding with one another and being limited by the circumference of the central opening D of the wheel. Each of the projections B and C is thus in shape similar to almost a half-collar and is terminated at its extremities by two faces $b\ b$ and $c\ c$, perpendicular to the plane of the wheel, as clearly shown in Fig. 2. In the example illustrated these faces $b\ b$ and $c\ c$ are in the same plane parallel to a diameter of the periphery of the wheel; but they might also be situated in different planes, forming between them any desired angle, the surfaces $b\ b$ and $c\ c$ being parallel to radii of the circle and perpendicular to the plane of the wheel. The central orifice consists of a circular opening D, into which merge two rectangular spaces $d\ d$, of which one of the sides of each coincides with the faces of the extremity $b$ and $c$ of the projections B and C. The hub or body of the wheel is also provided on one of its faces with a hollow cylindrical drum E, which is intended to maintain a suitable space or distance between this and an adjoining gear-wheel. The gear-wheel so constructed is mounted on a sleeve F, keyed or otherwise secured on the shaft G, connected to the motor. On this sleeve F are secured as many gear-wheels of this special construction as it is desired to have changes of speed. These special gear-wheels are in permanent engagement or mesh with an equal number of ordinary toothed wheels made fast to the driven shaft. Figs. 5 and 6 of the drawings show, by way of example, the arrangement of a two-speed gear. The two special gear-wheels A A', mounted on the sleeve F, secured upon the driving-shaft G, mesh with two plain toothed wheels H H', fast to the driven shaft I. A suitable distance is maintained between the two gear-wheels A A' by the cylindrical drum E of the wheel A. The sleeve F, which is of a suitable length corresponding with the number of gear-wheels mounted thereon, is journaled in suitable bearings, and the driving-shaft G is constructed so as to be displaceable longitudinally. This shaft G is fitted with a projection or finger g of suitable size to engage the face of one or the other of the extremities b b or c c of the one or other half-collars B or C (or B' C') of the hub of one or the other of the gear-wheels A A', mounted on the driving-shaft G.

The mechanism being thus constructed it is sufficient in order to obtain the transmission of power from the driving-shaft G to the driven shaft I with a determined speed relation to impart to the shaft G a position such that its finger g is placed so as to meet and engage the projection B or C (or B' C') of the gear-wheel A A', affording the relation of speed desired, so that this finger g abuts against and thus engages one face of the extremity b or c of one of these two projections. This driving method is simple and does not lose efficiency, because the finger g cleanly meets one or the other faces of one or the other projection from the gear-wheel and drives the latter freely and with certainty. This method of drive, which causes the engagement by causing a finger to bear against the side face of a projection on the plane of the gear-wheel, is strong and does not result in loss of efficiency by reason of the normal wear of the parts and of the faces in contact, as is the case with other change-speed gears, in which a slight burring of the metal may affect the proper working.

In Fig. 5 the driving-shaft G is shown in a position immediately before being engaged with the gear-wheel A', and this shaft is as it revolves moved in the direction indicated by the arrow. When the finger g meets one extremity c' of the projection C', it will engage the latter and drive the wheel A'. If the shaft G be pushed so that the finger g completely passes through the gear-wheel A' from the projection C' to the projection B' and clears the latter, the drive by the driving-shaft G ceases. It will be noted that the finger g passes through the gear-wheel, traveling in one or the other of the grooves d. If the shaft G be pushed more forward, so as to put the finger g in engagement with the projection C of the gear-wheel A, the latter will then be rendered fast to the driving-shaft.

The provision of two projections B and C, one on each side of the gear-wheel, enables the change to be effected without loss of time, whether the change be made from gear-wheel A to gear-wheel A', or vice versa.

It must be understood that the invention is not restricted to the particular application and details illustrated and that various modifications may be made in the same.

I claim as my invention—

1. A change-speed gear comprising a driving-shaft and a driven shaft, one of said shafts longitudinally movable and carrying a driving-finger, gears keyed on one shaft and intermeshing gears adapted to turn freely on said longitudinally-movable shaft, said last-named gears having openings through their faces at the side of the shaft, whereby said finger on the movable shaft may be passed through said faces and engage with the gear selected, and each gear provided with a hollow drum on its face, the drum of one gear turning freely on the adjacent gear.

2. A change-speed gear, having a shaft longitudinally movable and a key thereon, a number of gears loosely mounted on said shaft, each gear having a keyway through it next to said shaft, and each gear having a guiding projection on its face adapted to be brought into contact with the key to guide it into the said keyway, substantially as described.

3. A change-speed gear, having a shaft longitudinally movable and a key thereon, a number of gears loosely mounted on said shaft, each gear having an open keyway next to said shaft, and a guiding projection on each face of the gear adapted to guide the key into the keyway upon the key being brought into contact with said projections, substantially as described.

4. A change-speed gear, having a shaft longitudinally movable, a key thereon, a number of gears loosely mounted on said shaft, each gear provided with an open keyway next to said shaft, a hollow drum and guiding projections B, C, one on each face of the gear, substantially as described.

5. A change-speed gear, having a shaft longitudinally movable and a key thereon, a number of gears loosely mounted on said shaft, each gear provided with an open keyway next to said shaft, a hollow drum and a guiding projection B on one face of the gear and fitting within the drum of the adjacent gear, substantially as described.

6. A change-speed gear having a shaft longitudinally movable and a key thereon, a number of gears loosely mounted on said shaft, each gear provided with a hollow drum separating it from its adjacent gear, each gear provided with an open keyway next to said shaft, a guiding projection B on the face of the gear opposite from the drum, forming a bearing-surface for the drum of the adjacent gear, and a guiding projection C on the face of the gear which is provided with the drum, substantially as described.

In testimony whereof I have signed my name to this specification in the presence of two subscribing witnesses.

TH. GRIÈS.

Witnesses:
J. DAILLIER,
HY GARVILLY.